(12) United States Patent
Seal et al.

(10) Patent No.: US 7,047,401 B2
(45) Date of Patent: May 16, 2006

(54) HANDLING INTERRUPTS DURING MULTIPLE ACCESS PROGRAM INSTRUCTIONS

(75) Inventors: David James Seal, Cambridge (GB); Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 338 days.

(21) Appl. No.: 10/461,335

(22) Filed: Jun. 16, 2003

(65) Prior Publication Data
US 2004/0054833 A1  Mar. 18, 2004

(30) Foreign Application Priority Data
Sep. 16, 2002  (GB) .................................... 0221465

(51) Int. Cl.
*G06F 9/312* (2006.01)
(52) U.S. Cl. ...................................... 712/244
(58) Field of Classification Search ................. 712/224
See application file for complete search history.

(56) References Cited
U.S. PATENT DOCUMENTS
5,619,704 A * 4/1997 Yagi et al. ................. 710/262
5,784,607 A * 7/1998 Henry et al. ................ 712/245
5,790,844 A * 8/1998 Webb et al. ................ 712/227
5,805,879 A * 9/1998 Hervin et al. ............... 712/244
6,304,963 B1 * 10/2001 Elwood ...................... 712/244

FOREIGN PATENT DOCUMENTS
JP   5-158688   6/1993

* cited by examiner

Primary Examiner—William M. Treat
(74) Attorney, Agent, or Firm—Nixon & Vanderhye P.C.

(57) ABSTRACT

A data processing apparatus 2 supports multiple memory access program instructions LDM, STM which serve to load data values from multiple program registers 16 to respective memory locations or to store data values from multiple memory locations to respective program registers. A memory management unit 8 within the system stores device or strongly ordered memory attribute values which control whether or not a multiple memory access instruction involving such a memory location may be early terminated when an interrupt is received during its operation. Early termination is permitted in those circumstances where the multiple memory access instruction may be safely restarted and rerun in its entirety, whereas early termination is not permitted and the operation completes before the interrupt is taken in those circumstances where the memory locations are subject to a guaranteed number of memory accesses as this appears within the controlling program instructions.

18 Claims, 3 Drawing Sheets

HANDLING INTERRUPTS DURING MULTIPLE ACCESS PROGRAM INSTRUCTIONS

BACKGROUND OF THE INVENTION

1. Field of the Invention

This invention relates to the field of data processing. More particularly, this invention relates to the handling of interrupts within data processing systems having multiple memory access program instructions.

2. Description of the Prior Art

It is known to provide data processing systems, such as those based upon the ARM microprocessor architecture, which support multiple memory access program instructions. Example ARM instructions which are of this type are the LDM and STM which respectively load data values from a sequence of memory locations to a respective sequence of program registers or store data from a sequence of program registers to a respective sequence of memory locations. The provision of such multiple memory access instructions provides the ability to advantageously reduce code size. However, a problem associated with such multiple memory access program instructions is that they typically can take many processing cycles to complete and accordingly can have an adverse impact upon interrupt latency.

When a data processing system, such as a microprocessor, is executing a program, it is known to provide interrupt mechanisms whereby an asynchronous, and often external, signal may trigger an interrupt processing routine to be executed instead of the program which was previous executing. Such interrupt mechanisms are a fundamental part of many data processing systems and a significant performance parameter is the interrupt latency of the system. The interrupt latency is considered to be the worst case time it takes the system to start to execute interrupt handling code after receipt of an interrupt signal. In this context, the provision of multiple memory access program instructions which can take many processing cycles to complete (e.g. a worst case situation involving multiple cache misses and TLB misses several hundred processing cycles) and can be a controlling influence in establishing the worst case interrupt latency of the system. In some situations a system in which the maximum interrupt latency is controlled by such multiple memory access instruction may be unacceptable.

It is known to provide compilers which include control parameters that will limit the optimisations made such that memory accesses will not be concatenated together above a certain number into multiple memory access program instructions. It is also known to provide compiler control options that can serve to suppress the use of multiple memory access program instructions entirely.

SUMMARY OF THE INVENTION

Viewed from one aspect the present invention provides apparatus for processing data, said apparatus comprising:

processing logic operable in response to a multiple memory access program instruction specifying multiple memory accesses to perform a sequence of memory accesses to respective memory address locations;

an interrupt controller operable in response to an interrupt request signal to trigger an interrupt; and control logic operable when a multiple memory access program instruction is pending and responsive to a stored attribute value associated with at least one of said memory address locations to control said interrupt controller to either:

(i) terminate said multiple memory access program instruction part way through said sequence of memory accesses and trigger said interrupt; or (ii) wait until said sequence of memory accesses has completed and trigger said interrupt.

The invention recognises that whilst the normal control criteria of waiting until the currently executing memory access program instruction, (whether that be a single or multiple memory access program instruction) is completed is safe, there are a large number of situations in which a multiple memory access program instruction may be terminated part way through its operation and then safely restarted from its beginning without any adverse affects. More particularly, the invention recognises that the situations in which such multiple memory access program instructions may and may not be safely terminated part way through can be mapped onto predetermined memory locations or areas of memory locations. Thus, an attribute associated with a memory location may be used to control whether or not a multiple memory access program instruction accessing that memory location can be safely terminated part way through when an interrupt has been received and interrupt handling needs to be triggered. This allows multiple memory access program instructions to be used with the resulting advantages of improved code density, while safely providing a mechanism that avoids the disadvantageously long interrupt latencies that can be associated with such multiple memory access program instructions. Furthermore, those situations in which it would not be safe to terminate a multiple memory access program instruction part way through, such as memory accesses including memory locations that are read sensitive, may be prevented from occurring by associating an appropriate attribute value with those memory locations so that multiple memory access program instructions involving those memory locations will not be terminated part way through. This provides a safety net to assist in avoiding incorrect operation, but does mean that a programmer should avoid including any multiple memory access program instructions involving such memory locations which cannot support early termination if they are to get the benefit of a reduced maximum worst case interrupt latency.

Whilst it will be appreciated that the stored attribute could be used to control interrupt behaviour during multiple memory access program instructions for a variety of different reasons, it is particularly well suited to embodiments in which the stored attribute is indicative of whether a memory location is such that a memory access to the memory location changes behaviour of the system upon subsequent memory accesses. Such memory locations may be thought of as "read sensitive" or ones in which the number of accesses must be as it appears in the controlling program code.

More particularly preferred examples of how such a stored attribute are used are those in which the stored attribute indicates whether a memory location is one or more of a memory location associated with a device or a memory location which must be accessed in a predetermined position within a sequence of memory accesses (e.g. defined within the memory map as a device memory location (such as a peripheral) or a strongly ordered area of memory in which memory accesses must be performed in the sequence in which they appear in the program).

It will be appreciated that the present technique may be applied to different types of multiple memory access program instructions, such as load multiple instructions and store multiple instructions, but is particularly well suited to load multiple instructions.

Whilst the attribute value could be stored in a variety of different ways, such as in its own dedicated memory or set of registers etc, preferred embodiments of the invention utilise a memory management unit operable to store the attribute value. A memory management unit is often provided within data processing systems for storing a variety of control parameters associated with memory locations, such as the cacheable nature of the location, the write back status of the location etc, and re-using such a memory management unit to also store the attribute value associated with the present technique is advantageously efficient.

Whilst the above discusses a mode of operation in which a multiple memory access program instruction either may or may not be early terminated depending upon an attribute value associated with a memory location, preferred embodiments of the invention also provide a different mode of operation in which the interrupt controller waits until the sequence of memory accesses has completed irrespective of the attribute value. Such operation is particularly useful when seeking to debug programs and it is suspected that problems may be being caused by multiple memory access program instructions that are inappropriately used.

It will be appreciated that depending upon the state of the system when the interrupt was taken, it may be necessary to restart the multiple memory access program instruction if this was terminated partway through. Accordingly, preferred embodiments of the invention serve to store a re-start program counter value which varies depending upon whether or not the multiple memory access program instruction was or was not fully completed. A normal restart location associated with an interrupt does not vary.

Viewed from another aspect the invention provides a method of processing data, said method comprising the steps of:

in response to a multiple memory access program instruction specifying multiple memory accesses, performing a sequence of memory accesses to respective memory address locations;

in response to an interrupt request signal triggering an interrupt; wherein when a multiple memory access program instruction is pending and responsive to a stored attribute value associated with at least one of said memory address locations controlling operation to either:

(i) terminate said multiple memory access program instruction part way through said sequence of memory accesses and trigger said interrupt; or (ii) wait until said sequence of memory accesses has completed and trigger said interrupt.

As previously mentioned, if the maximum worst case interrupt latency is to be held low it is important that multiple memory access program instructions are not used to access memory locations having attribute values which will not permit such multiple memory access program instructions to be early terminated.

Accordingly, another aspect of the invention provides a computer program including identifiers associated with data values stored at memory locations having attributes that will not permit early termination of multiple memory access program instructions involving those memory locations such that a compiler during compilation of the computer program does not use multiple memory access program instructions which will involve such memory locations.

It will be appreciated that a computer program having the above mentioned identifiers correctly applied will have the advantage that upon compilation optimisation to use multiple memory access program instructions in circumstances where an increase in code density may be achieved without harming interrupt latency will be allowed whereas those circumstances in which such use of multiple memory access program instructions would adversely impact the maximum worst case interrupt latency can be avoided. A program written in this way should not include any multiple memory access program instructions that would fall into the category of those which could not be early terminated. Preferred embodiments of such computer programs use identifiers associated with a data type statement within the computer program and are particularly well suited to computer programs written in the C language.

A further aspect of the invention provides a computer program for controlling an apparatus for data processing as claimed in any one of claims 1 to 8, said computer program including one or more multiple memory access program instructions associated with memory locations having stored attribute values permitting termination of said multiple memory access program instruction part way through said sequence of memory accesses and single memory access program instructions associated with all memory accesses to memory locations having attribute values not permitting termination of multiple memory access program instructions part way through a sequence of memory accesses.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
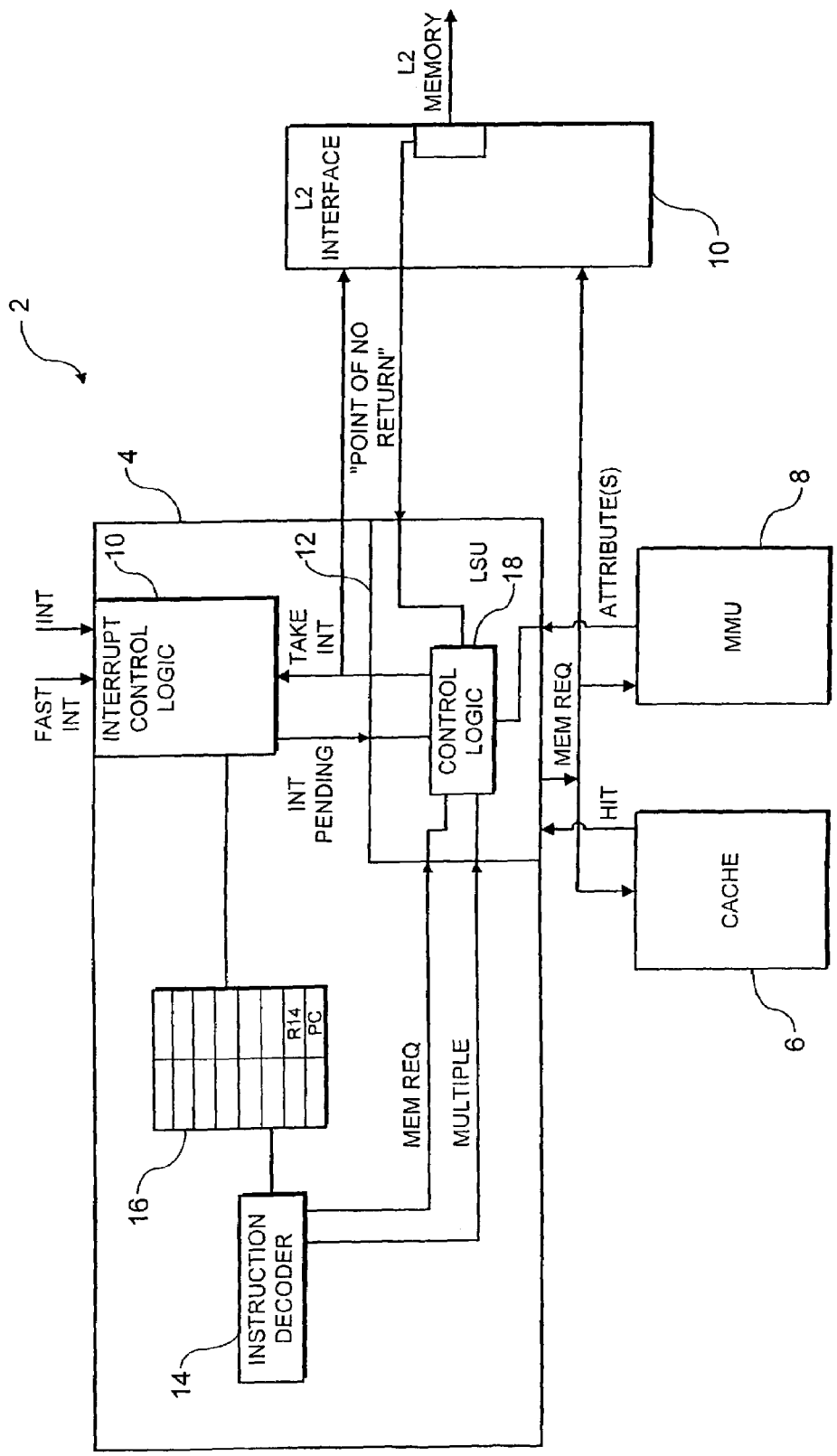
FIG. 1 schematically illustrates a data processing apparatus including interrupt controlling logic.

FIG. 1 illustrates a data processing apparatus 2 including a processor core 4 coupled to a cache memory 6, a memory management unit 8 and a level2 memory interface 10. It will be appreciated that, for the sake of clarity, not all elements within this data processing apparatus 2 have been illustrated.

The processor core 4 includes interrupt control logic 10 responsive to applied interrupt signals, such as a fast interrupt signal and a normal interrupt signal, and which controls the triggering of interrupt handling routines. The processor core 4 also includes a load store unit 12 for controlling load and store operations, including multiple memory access operations following multiple memory access program instructions. An instruction decoder 14 and a register bank 16 are also illustrated.

Within the load store unit 12 there is a provided control logic 18 which serves to control whether or not a multiple memory access which is currently in operation will or will not be early terminated upon receipt of an interrupt in dependence upon attribute values associated with memory locations involved in that memory access operation.

In operation, program instructions are received by the instruction decoder from a computer program which is being used to control the operation of the processor core 4. The processor core 4 may be an ARM processor core using the ARM instruction set. There are many different types of program instruction which the processor core 4 may respond to, such as arithmetic and logical instructions, as well as load and store instructions and other data manipulation instructions. The present technique is concerned with multiple memory access instructions of the LDM and STM type and accordingly the various hardware elements within the processor core 4 associated with different program instructions have not been illustrated. When the instruction decoder receives a multiple memory access program instruction, such as an LDM or STM, it signals that it has received a memory request to the load store unit 12 and also that the memory request is a multiple memory access memory request. The load store unit 12 will then service this instruction in the normal way providing an interrupt does not occur. Such a memory request will typically be referred to the cache memory 6 to see if a hit occurs indicating that the data values to which accesses are being made are ones that are stored within the cache memory 6. A check within the memory management unit 8 will also be made to ensure that the memory access is permitted and to recover other control parameters associated with the memory access. Included within the parameters recovered from the memory management unit 8 are attribute values associated with the memory locations being accessed that indicate whether or not those memory locations are classified as device memory locations or strongly ordered memory locations. Device memory locations are typically associated with devices such as FIFOs, peripherals and the like. Strongly ordered memory locations might be associated with control registers for the memory system in which it is important that memory accesses occur in the sequence in which they appear in the controlling program in order that proper operation should occur. A common factor between the device classification and the strongly ordered classification of memory locations is that a memory access to those memory locations may alter subsequent memory accesses and subsequent system behaviour.

The attribute values device and strongly ordered read from the memory management unit 8 are supplied to the control logic 18 within the load store unit 12. This control logic 18 also receives signals from the instruction decoder that specify that a memory access request is in operation and that the memory access request is a multiple memory access request. Another signal which is passed to the control logic 18 is an "point of no return" signal derived form the level2 memory interface 10. This "point of no return" signal may be provided in the form of a combination of other signals returned from the level2 memory interface 10 as well as state retained within the load store unit 12, but the combination of the signals and state may be decoded by the control logic 18 as indicating that a memory access has passed the point within the level2 memory interface 10 at which state external of the level2 memory interface 10 has or will be changed. It should be noted that in the context of the particular example embodiment being described herein, memory locations which are device memory locations or strongly ordered memory locations cannot be cached and accordingly will be accessed via the level2 memory interface 10 whenever they occur. Whilst this is true of this particular example embodiment, it is not a necessary requirement for the current technique in all situations.

The interrupt control logic 10 is responsive to interrupt signals such as the fast interrupt signal and the normal interrupt signal to trigger an interrupt vector to be taken. The standard mechanisms for responding to interrupts and triggering interrupt handling, such as via stored interrupt vectors, may be employed subject to the modifications described herein relating to multiple memory access program instructions that are in operation when an interrupt is received. When the interrupt control logic 10 receives an interrupt signal, it issues an "interrupt pending" signal to the load store unit 12, and more particularly to the control logic 18 within the load store unit 12. The interrupt control logic 10 then waits for a "take interrupt" signal to be returned from the load store unit 12 as generated by the control logic 18 before triggering the interrupt to be initiated. The interrupt control logic 10 in this embodiment issues the interrupt pending signal and waits for the take interrupt signal irrespective of whether or not the current program instruction being decoded is a memory access request.

As will be discussed in more detail below, if the current program instruction is not a memory access request, then the take interrupt signal may be immediately returned by the load store unit 12 and the interrupt control logic 10 can proceed to trigger the interrupt in its normal way. The interrupt control logic 10 triggers an interrupt by saving the current program counter PC value in a register R14 within the register bank 16 (and saving other processing status information elsewhere) and then loading a new program counter value PC as read from an interrupt vector stored in memory associated with the interrupt signal that has been received. Program execution is thus forced to an interrupt handling routine. When it is desired to resume normal program execution, the stored program counter value from the register R14 is returned to the program counter PC and execution resumed.

It will be appreciated that if a program instruction is terminated part way through, then the program counter value will not yet have been updated and accordingly the stored return program counter value will restart the program instruction which was early terminated. Conversely, if the interrupt was not taken until the program instruction which was in operation had completed, then the program counter value will have been incremented following that instruction and accordingly the normal processing will restart at the following instruction once the interrupt handling has finished.

Figure 2:
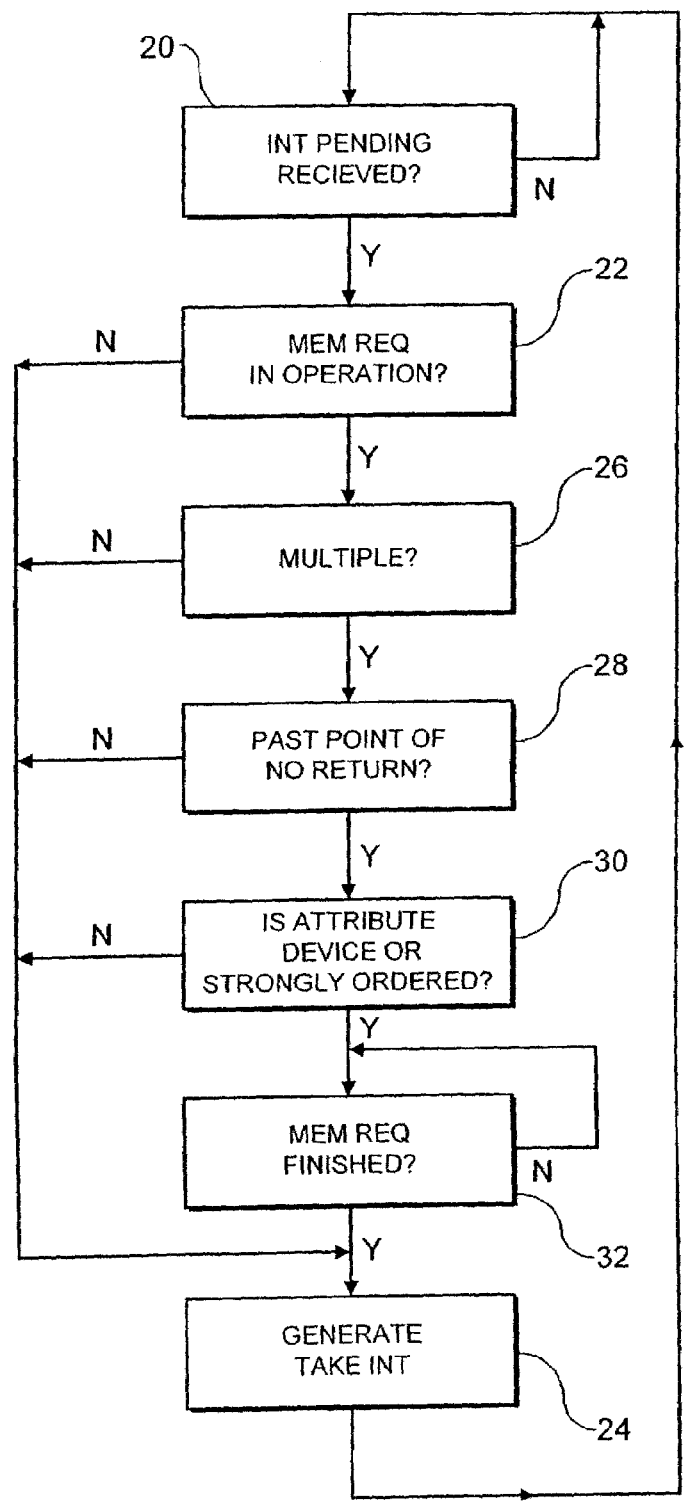
FIG. 2 is a flow diagram schematically illustrating a processing operation performed in controlling interrupt behaviour.

FIG. 2 is a flow diagram illustrating the processing operation performed by the control logic 18. It will be appreciated that this processing may in practice be carried out in parallel by an array of combinatorial logic, but for the sake of clarity this has been illustrated in FIG. 2 as a sequential flow diagram. At step 20, the process waits until an interrupt pending signal is received from the interrupt control logic 10. At step 22 a determination is made as to whether or not the instruction decoder 14 indicates that the current instruction being decoded is a memory access request instruction and accordingly it is this type of instruction that is currently in operation and which potentially may be early terminated. If the determination at step 22 is that a memory access request is not currently in operation, then processing proceeds to step 24 at which the take interrupt signal is generated and returned to the interrupt control logic 10 thereby triggering the interrupt control logic to start the interrupt handling process.

If the determination at step 22 was that a memory access request is in operation, then step 26 determines whether or not that memory access operation is a multiple memory access operation. If the determination at step 26 was that the memory access in operation is not a multiple memory access, then processing proceeds to step 24 and the access stopped via a signal to the level 2 interface, otherwise processing proceeds to step 28.

Step 28 determines from a combination of state within the load store unit 12 and signals returned from the level2 to memory interface 10 whether or not a point of no return has been passed for the multiple memory access operation in question, i.e. signals have been passed external of the level 2 memory interface 10 with the result that state external of the level 2 memory interface 10 may have been changed and accordingly the multiple memory access operation cannot be early terminated without further consideration. If the point of no return has not been passed, then processing may proceed to step 24, otherwise processing proceeds to step 30.

Step 30 determines whether the attribute values read from the memory management unit 8 in association with the multiple memory access request being serviced indicate that the multiple memory access is associated with memory locations classified as device memory locations or strongly ordered memory locations. Such classification, if present, precludes early termination. If the attributes returned do not indicate that the memory locations are device memory locations or strongly ordered memory locations, then processing proceeds to step 24, otherwise processing proceeds to step 32 where the process waits until the memory request in operation has finished before processing proceeds to step 24.

It will be appreciated that the overall action of FIG. 4 is to allow memory access instructions, including multiple memory access instructions, to be early terminated except when those memory access instructions have had an effect external of the level2 memory interface 10 and the attribute values associated with the involved memory locations indicate that those memory locations are "read sensitive" or "write sensitive" (Viewed in another way are such that a guarantee is required that the number of accesses to those memory locations will be the same as it appears in the controlling program). In these circumstances, the memory accesses are not early terminated and the system waits until they finish before the interrupt is generated.

Figure 3:
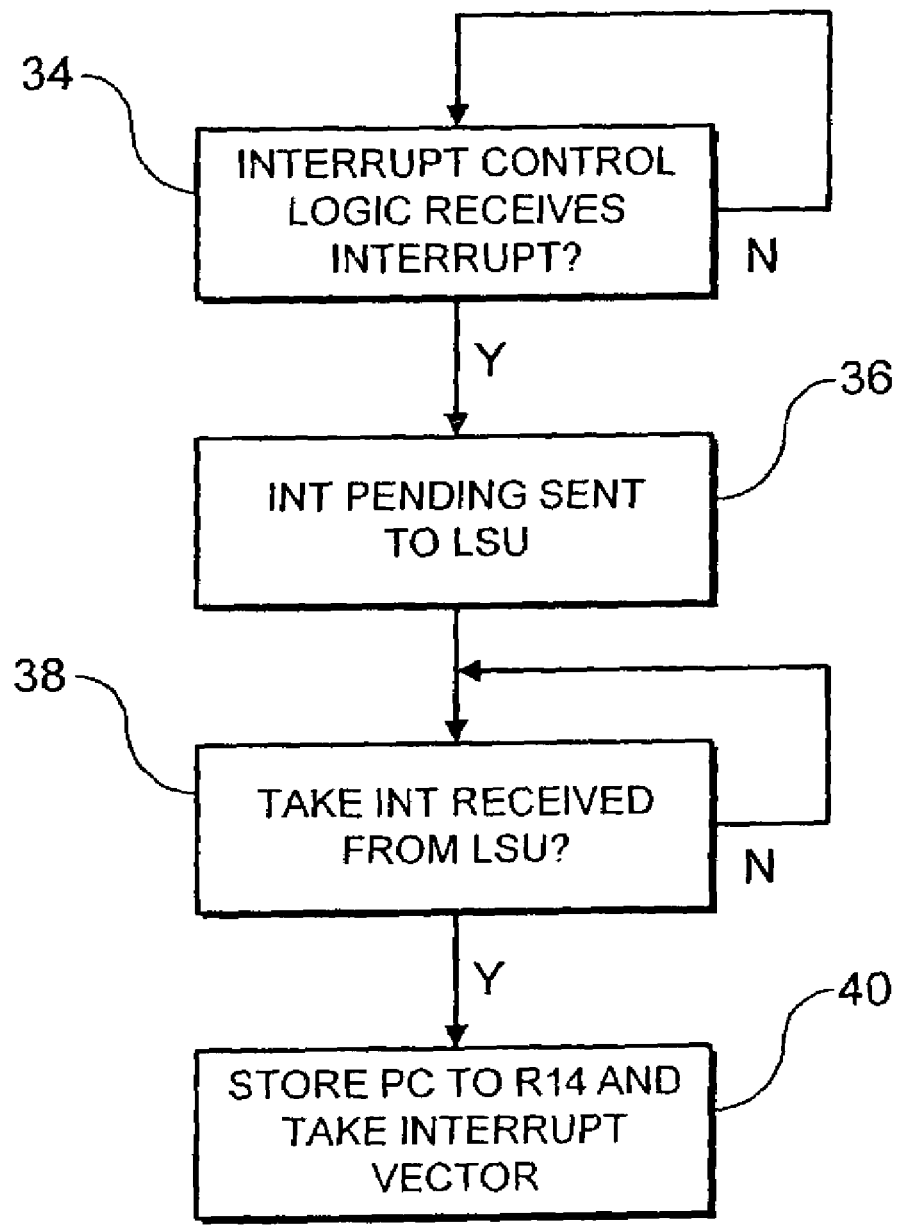
FIG. 3 is a flow diagram schematically illustrating the handling of an interrupt.

FIG. 3 is a flow diagram schematically illustrating the processing operations which may be considered as being performed by the interrupt control logic 10. At step 34 the process waits for an interrupt signal to be received. Once an interrupt signal has been received, step 36 passes an interrupt pending signal to the load store unit 12. The process then waits at step 38 until a take interrupt signal is received back from the load store unit 12. Once the take interrupt signal has been received from the load store unit 12, processing proceeds to step 40 at which the current program counter PC value stored within the register bank 16 is stored to register R14 and the interrupt vector forced into the program counter register to redirect processing to the interrupt handling program.

The above description of FIG. 1 and its operation has involved an operational mode in which multiple memory access program instructions are either early terminated or not early terminated in dependence upon read memory location attribute values. However, the apparatus may also operation in another mode in which such multiple memory access program instructions are never early terminated. This mode of operation may be achieved by modifying the operation of the control logic 18 such that the step 30 in FIG. 2 is not present and all memory access program instructions which are multiple memory access instructions and are beyond their point of no return are passed to step 32 to await the memory access being finished before step 24 is reached and the take interrupt signal generated. Such an alternative mode of operation may be forced upon the control logic 18 by an externally applied control signal or a registered control signal within a control register or the like. Such a mode of operation may be particularly useful in debugging situations, for example when interrupt latency is not a concern and it is desired to investigate whether or not problems are occurring due to inappropriate multiple memory access program instructions.

It will be appreciated that it is desirable for computer programs executing on the data processing apparatus described above to have certain characteristics if they are to gain benefit from the technique. In particular, the apparatus described in FIG. 1 allows the early termination of multiple memory access program instructions which are not to device or strongly ordered memory locations, but prevents the early termination of memory access instructions which are to such memory locations. If such multiple memory access program instructions which cannot be early terminated are present within the computer program, then they may serve to control the maximum worst case interrupt latency in a disadvantageous way. Accordingly, computer programs aiming to exploit the present technique should be written so as not to include multiple memory access program instructions to device or strongly ordered memory locations.

One way of providing such computer programs is to include within the computer programs identifiers of memory locations or pointers to memory locations or data types referring to memory locations which are device or strongly ordered memory locations. Having included such identifiers within the computer program, which may be a C language computer program, a compiler operating upon that computer program may be controlled so as to not generate any multiple memory accesses program instruction which involved the memory locations marked out by the identifiers. Conversely, multiple memory access instructions may be used for improving the result in code density in those situations where early termination of those multiple memory access program instructions would be allowed by the apparatus for FIG. 1.

In a more specific example utilising the C computer program language, the data type associated with a pointer to a memory location that is a device or strongly ordered memory location, may be given as "volatile". The compiler programs produced by ARM Limited and publicly available operate so that memory accesses to memory locations identified as "volatile" are not included within LDM or STM instructions generated by the compiler.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   processing logic operable in response to a multiple memory access program instruction specifying multiple memory accesses to perform a sequence of memory accesses to respective memory address locations;
   an interrupt controller operable in response to an interrupt request signal to trigger an interrupt; and
   control logic operable when a multiple memory access program instruction is pending and responsive to a stored attribute value associated with at least one of said memory address locations to control said interrupt controller to either:
   (i) terminate said multiple memory access program instruction part way through said sequence of memory accesses and trigger said interrupt; or
   (ii) wait until said sequence of memory accesses has completed and trigger said interrupt.

2. Apparatus as claimed in claim 1, wherein said stored attribute is indicative of whether a memory location is such that a memory access to said memory location changes behaviour upon subsequent memory accesses.

3. Apparatus as claimed in claim 1, wherein said stored attribute is indicative of whether a memory location is one or more of:
   a memory location associated with a device;
   a memory location which must be accessed in a predetermined position within a sequence of memory accesses.

4. Apparatus as claimed in claim 1, wherein said a multiple memory access program instruction is one of:
   (i) a load multiple instruction specifying a sequence of memory locations from which stored values are to be stored to a sequence of registers within a register bank; and
   (ii) a store multiple instruction specifying a sequence of registers within a register bank from which stored values are to be stored to a sequence of memory locations.

5. Apparatus as claimed in claim 1, comprising a memory management unit operable to store said attribute value.

6. Apparatus as claimed in claim 1, wherein said control logic is operable in a different mode of operation to control said interrupt controller to wait until said sequence of memory accesses has completed and trigger said interrupt independently of said stored attribute value.

7. Apparatus as claimed in claim 1, wherein said interrupt controller is operable to store a restart program counter value from which program execution should be restarted following an interrupt, said restart program counter value serving to restart program execution either:
   (i) with said multiple memory access program instruction when said multiple memory access program instruction was terminated part way through said sequence of memory accesses; or
   (ii) with an instruction following said multiple memory access program instruction when said sequence of memory accesses was allowed to complete.

8. A method of processing data, said method comprising the steps of:
   in response to a multiple memory access program instruction specifying multiple memory accesses, performing a sequence of memory accesses to respective memory address locations;
   in response to an interrupt request signal triggering an interrupt; wherein
   when a multiple memory access program instruction is pending and responsive to a stored attribute value associated with at least one of said memory address 30 locations controlling operation to either:
   (i) terminate said multiple memory access program instruction part way through said sequence of memory accesses and trigger said interrupt; or
   (ii) wait until said sequence of memory accesses has completed and trigger said interrupt.

9. A method as claimed in claim 7, wherein said stored attribute is indicative of whether a memory location is such that a memory access to said memory location changes behaviour upon subsequent memory accesses.

10. A method as claimed in claim 7, wherein said stored attribute is indicative of whether a memory location is one or more of:
    a memory location associated with a device;
    a memory location which must be accessed in a predetermined position within 10 a sequence of memory accesses.

11. A method as claimed in claim 7, wherein said a multiple memory access program instruction is one of:

(i) a load multiple instruction specifying a sequence of memory locations from 15 which stored values are to be stored to a sequence of registers within a register bank; and (ii) a store multiple instruction specifying a sequence of registers within a register bank from which stored values are to be stored to a sequence of memory locations.

12. A method as claimed in claim 7, comprising a memory management unit operable to store said attribute value.

13. A method as claimed in claim 7, wherein said control logic is operable in a different mode of operation to control said interrupt controller to wait until said sequence of memory accesses has completed and trigger said interrupt independently of said stored attribute value.

14. A method as claimed in claim 7, wherein said interrupt controller is operable to store a restart program counter value from which program execution should be restarted following an interrupt, said restart program counter value serving to restart program execution either:

(i) with said multiple memory access program instruction when said multiple memory access program instruction was terminated part way through said sequence of memory accesses; or (ii) with an instruction following said multiple memory access program s instruction when said sequence of memory accesses was allowed to complete.

15. A computer program for controlling an apparatus for data processing as claimed in claim 1, said computer program including at least one identifier associated with a data value stored at a memory location having an attribute value operable to control said interrupt controller to wait until at sequence of memory accesses has completed before triggering an interrupt such that, during compilation of said computer program by a compiler, a memory access to a memory location having said identifier is not concatenated with other memory accesses to form a multiple memory access program instruction.

16. A computer program as claimed in claim 15, wherein said identifier is associated with a data type statement within said computer program.

17. A computer program as claimed in claim 15, said computer program being a C language computer program.

18. A computer program for controlling an apparatus for data processing as claimed in claim 1, said computer program including one or more multiple memory access program instructions associated with memory locations having stored attribute values permitting termination of said multiple memory access program instruction part way through said sequence of memory accesses and single memory access program instructions associated with all memory accesses to memory locations having attribute values not permitting termination of multiple memory access program instructions part way through a sequence of memory accesses.

* * * * *